(12) United States Patent
Suontausta et al.

(10) Patent No.: US 7,840,399 B2
(45) Date of Patent: Nov. 23, 2010

(54) METHOD, DEVICE, AND COMPUTER PROGRAM PRODUCT FOR MULTI-LINGUAL SPEECH RECOGNITION

(75) Inventors: Janne Suontausta, Tampere (FI); Jilei Tian, Tampere (FI)

(73) Assignee: Nokia Corporation, Espoo (FI)

( * ) Notice: Subject to any disclaimer, the term of this patent is extended or adjusted under 35 U.S.C. 154(b) by 1359 days.

(21) Appl. No.: 11/100,991

(22) Filed: Apr. 7, 2005

(65) Prior Publication Data

US 2006/0229864 A1    Oct. 12, 2006

(51) Int. Cl.
G06F 17/20    (2006.01)
G06F 17/27    (2006.01)
G06F 17/28    (2006.01)
G10L 15/00    (2006.01)
G10L 15/04    (2006.01)
G10L 13/00    (2006.01)

(52) U.S. Cl. .................. 704/8; 704/2; 704/9; 704/231; 704/251; 704/254; 704/257; 704/258; 704/260; 715/256; 715/264; 715/265

(58) Field of Classification Search .................. 704/8, 704/258, 260, 9, 2, 231, 251, 254; 715/536
See application file for complete search history.

(56) References Cited

U.S. PATENT DOCUMENTS

| | | | | |
|---|---|---|---|---|
| 5,649,214 | A * | 7/1997 | Bruso et al. .................. 704/8 |
| 5,758,314 | A * | 5/1998 | McKenna ....................... 704/8 |
| 5,778,213 | A * | 7/1998 | Shakib et al. ................. 703/27 |
| 5,784,071 | A * | 7/1998 | Tang et al. ................... 345/467 |
| 5,793,381 | A * | 8/1998 | Edberg et al. ................ 345/467 |
| 6,204,782 | B1 * | 3/2001 | Gonzalez et al. ............. 341/90 |
| 6,389,385 | B1 * | 5/2002 | King .......................... 703/27 |
| 6,460,015 | B1 * | 10/2002 | Hetherington et al. ......... 704/8 |
| 7,035,801 | B2 * | 4/2006 | Jimenez-Feltstrom ....... 704/255 |
| 7,218,252 | B2 * | 5/2007 | Fauque ........................ 341/50 |
| 7,389,474 | B2 * | 6/2008 | Rettig et al. ................. 715/263 |
| 7,506,254 | B2 * | 3/2009 | Franz .......................... 715/259 |
| 7,555,433 | B2 * | 6/2009 | Otani .......................... 704/277 |
| 2003/0033334 | A1 * | 2/2003 | Banerjee et al. ............. 707/542 |
| 2003/0050779 | A1 * | 3/2003 | Riis et al. ................... 704/236 |
| 2004/0078191 | A1 * | 4/2004 | Tian et al. ...................... 704/9 |
| 2005/0010392 | A1 * | 1/2005 | Chen et al. ..................... 704/8 |
| 2005/0114145 | A1 * | 5/2005 | Janakiraman et al. ........ 704/277 |
| 2005/0144003 | A1 * | 6/2005 | Iso-Sipila ................... 704/269 |

OTHER PUBLICATIONS

Davis, Mark. "Unicode Technical Report #22: Character Mapping Markup Language." Aug. 16, 2002. <http://www.unicode.org/reports/tr22/tr22-3.html>.*

(Continued)

*Primary Examiner*—David R Hudspeth
*Assistant Examiner*—Paras Shah
(74) *Attorney, Agent, or Firm*—AlbertDhand LLP

(57) ABSTRACT

A method of multi-lingual speech recognition can include determining whether characters in a word are in a source list of a language-specific alphabet mapping table for a language, converting each character not in the source list according to a general alphabet mapping table, converting each converted character according to the language-specific alphabet mapping table, verifying that each character in the word is in a character set of the language, removing characters not in the character set of the language, and identifying a pronunciation of the word.

22 Claims, 6 Drawing Sheets

OTHER PUBLICATIONS

T. Schultz et al.: Multilingual and Crosslingual SpeechRecognition, Proc. DARPA Workshop on Broadcast NewsTranscription and Understanding, pp. 259-262, Lansdowne,VA 1998.*

Sampa computer readable phonetic language. UCL Division of Psychology and Language Sciences. Oct. 2005. www.phon.ucl.ac.uk/home/sampa.*

Speaker- And Language-Independent Speech Recognition In Mobile Communication Systems, Viikki et al., IEEE 2001, Finland, pp. 5-8.

Tian et al., "Multilingual pronunciation modeling for improving multilingual speech recognition" ICSLP 2002: 7th International Conference on Spoken Language Processing. Denver, Colorado, Sep. 16-20, 2002. Adelaide, AU: Casual Productions, vol. 4 of 4, p. 497, Sep. 16, 2002. XP007011165.

International Search Report for PCT Application No. PCT/IB2006/000797.

* cited by examiner

| French | | Portuguese | | Spanish | |
|---|---|---|---|---|---|
| Source | Target | Source | Target | Source | Target |
| à | à | à | à | á | á |
| â | â | á | á | é | é |
| ç | ç | â | â | í | í |
| é | é | ã | ã | ñ | ñ |
| ê | ê | ç | ç | ó | ó |
| ë | ë | é | é | ú | ú |
| î | î | ê | ê | ü | ü |
| ï | ï | í | í | | |
| ô | ô | ò | ò | | |
| ö | ö | ó | ó | | |
| ù | ù | ô | ô | | |
| û | û | õ | õ | | |
| ü | ü | ú | ú | | |
| | | ü | ü | | |

FIG. 3

| Romanian | |
|---|---|
| Source | Target |
| q | <NULL> |
| w | <NULL> |
| y | <NULL> |
| ţ | ţ |
| ş | ş |
| š | š |
| â | â |
| î | î |

FIG. 4

| French, Portuguese, Spanish, and English |||||||
|---|---|---|---|---|---|
| Source | Target | Source | Target | Source | Target |
| à | a | ë | e | ò | o |
| á | a | î | i | ó | o |
| â | a | ï | i | õ | o |
| ã | a | í | i | ù | u |
| ç | c | ñ | n | û | u |
| é | e | ô | o | ü | u |
| ê | e | ö | o | ú | u |

FIG. 5

| Ukrainian | | Ukrainian | | Ukrainian | |
|---|---|---|---|---|---|
| Source | Target | Source | Target | Source | Target |
| a | а | u | у | в | в |
| b | б | v | в | г | г |
| c | ц | w | <NULL> | к | к |
| d | д | x | <NULL> | р | р |
| e | е | y | <NULL> | с | с |
| f | ф | z | з | т | т |
| g | г | ї | ї | у | у |
| h | х | д | д | ф | ф |
| i | и | а | а | х | х |
| j | й | е | е | ч | ч |
| k | к | п | п | ц | ц |
| l | л | з | з | ш | ш |
| m | м | и | и | щ | щ |
| n | н | л | л | ь | ь |
| o | о | ж | ж | ю | ю |
| p | п | б | б | я | я |
| q | <NULL> | м | м | є | є |
| r | р | н | н | і | і |
| s | с | о | о | | |
| t | т | й | й | | |

METHOD, DEVICE, AND COMPUTER PROGRAM PRODUCT FOR MULTI-LINGUAL SPEECH RECOGNITION

CROSS REFERENCE TO RELATED APPLICATIONS

None.

BACKGROUND OF THE INVENTION

1. Field of the Invention

The present invention relates generally to speech recognition methods and systems. More specifically, the present invention relates to a method, device, and computer program product for multi-lingual speech recognition.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

Automatic Speech Recognition (ASR) technologies have been adopted in mobile phones and other hand-held communication devices. A speaker-trained name dialer is probably one of the most widely distributed ASR applications. In the speaker-trained name dialer, the user has to train the models for recognition, and it is known as a speaker dependent name dialing (SDND) application. Applications that rely on more advanced technology do not require the user to train any models for recognition. Instead, the recognition models are automatically generated based on the orthography of the multi-lingual words. Pronunciation modeling, also called text-to-phoneme mapping (TTP), based on orthography of the multi-lingual words is used, for example, in the Multilingual Speaker-Independent Name Dialing (ML-SIND) system, as disclosed in Viikki et al. ("Speaker- and Language-Independent Speech Recognition in Mobile Communication Systems", in Proceedings of International Conference on Acoustics, Speech, and Signal Processing, Salt Lake City, Utah, USA 2002). Due to globalization as well as the international nature of the markets and future applications in mobile phones, the demand for multilingual speech recognition systems is growing rapidly.

Automatic language identification (LID) is an integral part of multi-lingual systems that use dynamic vocabularies. LID module detects the language of the vocabulary item. Once the language has been determined, the language dependent pronunciation model is applied to obtain the phoneme sequence associated with the written form of the vocabulary item. Finally, the recognition model for each vocabulary item is constructed by concatenating the multilingual acoustic models. Using these basic modules the recognizer can, in principle, automatically cope with multilingual vocabulary items without any assistance from the user. The pronunciation of a given text in a particular language can usually be found in automatic speech recognition and text-to-speech systems. However, conventional systems are generally unable to find the pronunciations of the texts in any other language supported by the system. Other languages may be considered mismatched languages. It is common to have the mismatched languages due to some reasons, e.g. LID errors, non-native vocabulary items, N-Best or multiple pronunciation scheme, etc. It is not trivial to find the pronunciations of the given texts in mismatched languages because different languages have different alphabet sets and different pronunciation rules. For example, one cannot directly find English pronunciation of Russian text "борис" because of the different alphabet sets between English and Russian.

There is a need to handle multi-lingual textual input in multi-lingual automatic speech recognition systems. Further, there is a need to process multi-lingual automatic speech recognition such that TTP can be applied to find the pronunciation for textual input in any supported language.

SUMMARY OF THE INVENTION

In general, exemplary embodiments include a symbol conversion table that maps the alphabet set of any language to the alphabet set of any other language. As such, a text-to-phoneme module of a multi-lingual speech recognition system can provide pronunciations for words in the vocabulary of a language. Techniques to carry out the symbol mapping can include language-dependent and language-independent parts.

One exemplary embodiment relates to a method of multi-lingual speech recognition. This method can include determining whether characters in a word are in a source list of a language-specific alphabet mapping table for a language, converting each character not in the source list according to a general alphabet mapping table and, where such conversion is performed, converting each converted character according to the language-specific alphabet mapping table for the language. The method further includes verifying that each character in the word is in a character set of the language, removing characters not in the character set of the language, and identifying a pronunciation of the word.

Another exemplary embodiment relates to a device for multi-lingual speech recognition. The device can include a LID module that assigns language identifiers to words, a TTP module that applies language-specific TTP models to generate a multi-lingual phoneme sequence associated with words identified by the LID module, a multi-lingual acoustic modeling module that constructs a recognition model for each vocabulary entry according to phonetic transcription, and a processor. The processor executes programmed instructions to determine whether characters in a word are in a source list of a language-specific alphabet mapping table for a language, convert each character not in the source list according to a general alphabet mapping table, convert each converted character according to the language-specific alphabet mapping table, and remove characters not in the character set of the language.

Another exemplary embodiment relates to a computer program product including computer code that determines whether characters in a word are in a source list of a language-specific alphabet mapping table for a language, computer code that searches a general alphabet mapping table for each character in the word that is not in the source list, computer code that converts each character not in the source list according to the general alphabet mapping table, computer code that converts each converted character according to the language-specific alphabet mapping table, and computer code that removes characters not in a character set of the language.

Another exemplary embodiment relates to a device for multi-lingual speech recognition. The device can include means for assigning language identifiers to words, means for applying language-specific text-to-phoneme (TTP) models to generate a multi-lingual phoneme sequence associated with words identified by the assigning means, means for constructing a recognition model for each vocabulary entry according to phonetic transcription, and means for executing programmed instructions to determine whether characters in a word are in a source list of a language-specific alphabet mapping table for a language, convert each character not in the source list according to a general alphabet mapping table, convert each converted character according to the language-specific alphabet mapping table, and remove characters not in the character set of the language.

BRIEF DESCRIPTION OF DRAWINGS

FIG. 3 is a language-specific mapping table for French, Portuguese, and Spanish. in accordance with an exemplary embodiment.

FIG. 4 is a language-specific mapping table for Romanian in accordance with an exemplary embodiment.

FIG. 5 is a general mapping table for the multi-lingual speech recognition engine of FIG. 1 with French, Portuguese, Spanish, and English in accordance with an exemplary embodiment.

FIG. 6 is a language-specific mapping table for Ukrainian in accordance with an exemplary embodiment.

DETAILED DESCRIPTION OF EXEMPLARY EMBODIMENTS

Figure 1:
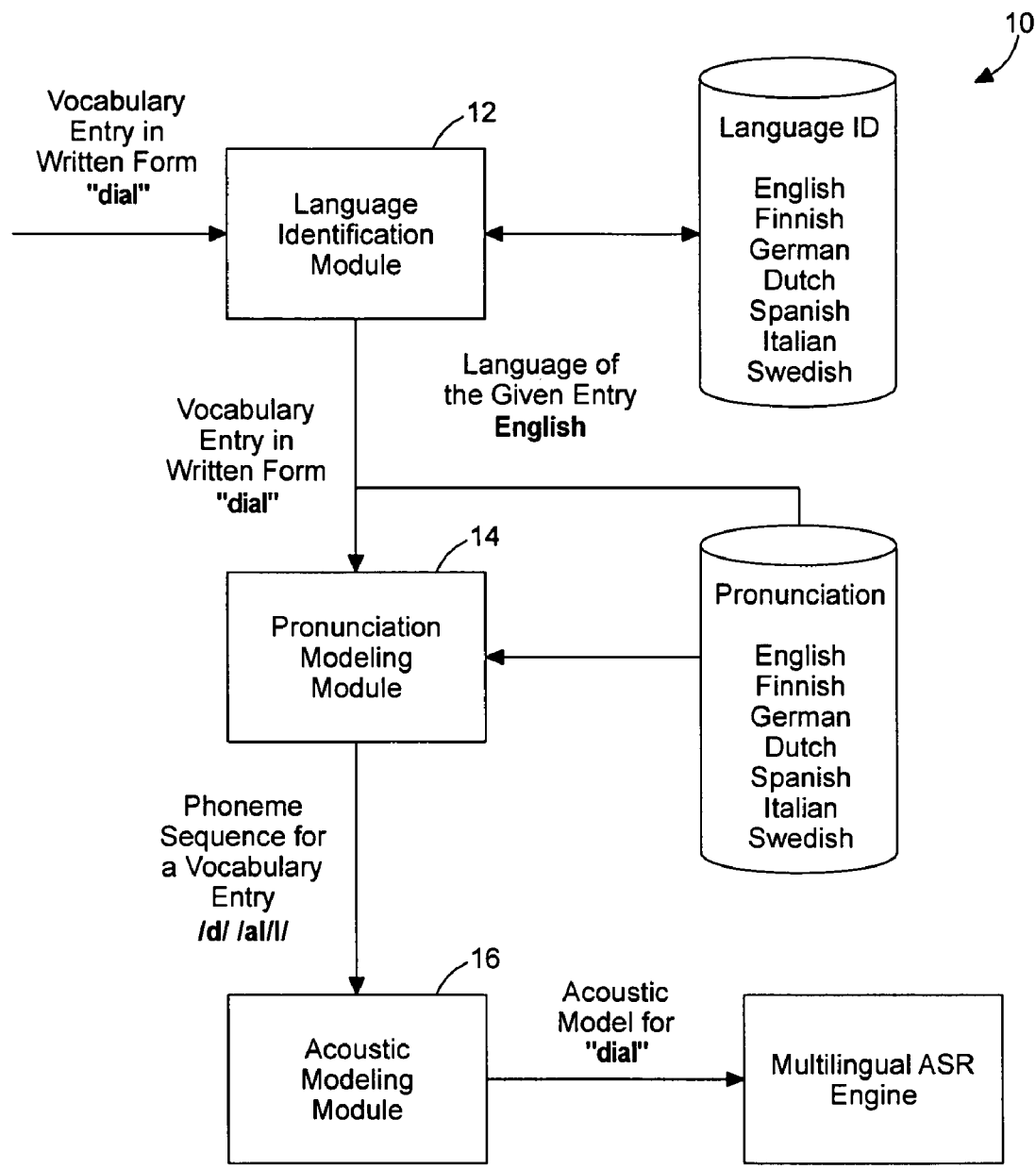
FIG. 1 is a general diagram of a multi-lingual speech recognition system in accordance with an exemplary embodiment.

FIG. 1 illustrates a multi-lingual speech recognition system 10 including an LID module 12, an on-line language-specific TTP module 14, and a multi-lingual acoustic modeling module 16. The LID module 12 assigns language tags or identifiers to each new word. The TTP module 14 applies language-specific TTP models to generate a multi-lingual phoneme sequence associated with the written form of the vocabulary item. The multi-lingual acoustic modeling module 16 constructs a recognition model for each vocabulary entry according to phonetic transcription.

The speaker independent multi-lingual speech recognition (ML-ASR) system 10 operates on a vocabulary of words given in textual form. The words in the vocabulary may originate from multiple languages, and the language identifiers are not given by the user. Instead, the LID module 12 of the ML-ASR system 10 provides the language IDs for the words. The LID module 12 makes errors and the language IDs are not always correct. By way of any example, the LID module 12 was trained on four languages, including English, French, Portuguese, and Spanish.

Table 1 below presents language identification rates for these languages.

TABLE 1

| Language | 1. best LID | 2. best LID | 3. best LID | 4. best LID |
|---|---|---|---|---|
| US-English | 65.02 | 19.43 | 14.49 | 1.06 |
| French | 54.64 | 31.69 | 3.83 | 9.84 |
| Portuguese | 52.70 | 31.08 | 10.14 | 6.08 |
| Spanish | 54.35 | 33.15 | 9.78 | 2.72 |

As seen from Table 1, LID rates can be low. Due to such low LID rates, an N-best set of LID languages is utilized. If the N-best list is of suitable size, the correct language is one of the language IDs in the list and the correct pronunciation can be found for the word. In addition, some texts, for example many names, may belong to different languages, so multiple languages are used. Many loanwords also require proper handling of the mismatch languages. For the non-native speakers, it is common to speak the multi-lingual texts in their mother tongue that may be other than the matched language.

Different languages have different alphabet sets. The multi-lingual speech recognition system 10 includes a mapping from the character set of any language to the character set of any other language. With this kind of mapping, the TTP module 14 can provide the pronunciations for the N-best list of languages of each word in the vocabulary.

Figure 2:
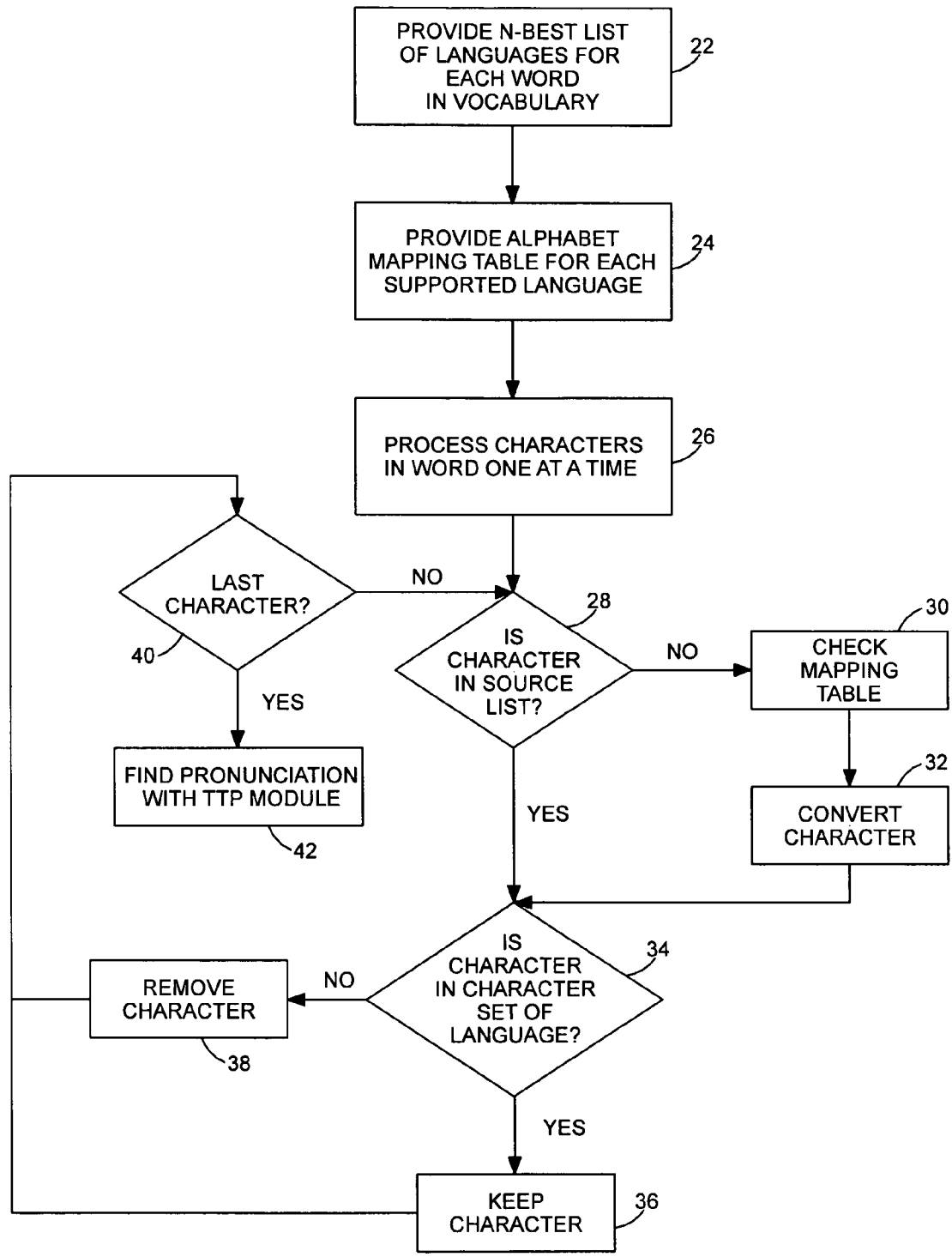
FIG. 2 is a diagram depicting operations performed in the text processing in the multi-lingual speech recognition system of FIG. 1 in accordance with an exemplary embodiment.

FIG. 2 illustrates operations performed in the processing of textual input for multi-lingual speech recognition. This processing includes the mapping between languages supported by the ML-ASR system to the alphabet of any other language supported by the ML-ASR system. Additional, fewer, or different operations may be performed depending on the particular embodiment.

In an operation 22, an N-best list of languages is provided for each word in a vocabulary. In an operation 24, an alphabet mapping table is provided for each language supported by the ML-ASR system. In addition to the language specific alphabet mapping table, there is a general alphabet mapping table composed of the characters in all the language-specific alphabet sets. In the creation of the mapping tables, a standard alphabet set is defined. By way of example, normal Latin characters [a-z] are used. The ith language-specific and the standard alphabet sets are denoted as $LS_i$, and SS, respectively. As such, $$LS_i = \{c_{i,1}, c_{i,2}, \ldots, c_{i,ni}\}; i=1, 2, \ldots, N$$

$$SS = \{s_1, s_2, \ldots, s_M\};$$

where $c_{i,k}$, and $s_k$ are the kth characters in the ith language-specific and the standard alphabet sets. ni and M are the sizes of the ith language-dependent and the standard alphabet sets.

Two kinds of alphabet mapping tables are created. One is the general alphabet mapping table defined for all the characters in all the language specific alphabet sets. Another one is the language specific alphabet mapping table for each language supported by the ML-ASR system. In the mappings tables, the character mapping pairs are defined from the source character (L_source) to the target character (L_target) as follows:

| General | |
|---|---|
| General.L_source$_l$ | General.L_target$_l$ |
| ...... | |
| General.L_source$_m$ | General.L_target$_m$ |
| ...... | |
| Language$_i$ | |
| Language$_i$.L_source$_{il}$ | Language$_i$.L_target$_{il}$ |
| ...... | |
| Language$_i$.L_source$_{i,ni}$ | Language$_i$.L_target$_{i,ni}$ |
| ...... | |

In the general mapping table, a source character belongs to the union of all the characters in all the language specific alphabet sets $LS_i$; and a target character belongs to the standard alphabet set SS. The corresponding mapping is denoted as General(.).

$$\text{General.L\_source} \in \bigcup_{i=1}^{N} LS_i$$

$$\text{General.L\_target} \in SS$$

In the ith language specific mapping table, a source character belongs to the union of the language specific alphabet set $LS_i$ and the standard alphabet set SS; and a target character belongs to the language specific alphabet set $LS_i$ only. The corresponding mapping is denoted as $\text{Language}_i(.)$.

$$\text{Language}_i.L\_source \in LS_i \cup SS$$

$$\text{Language}_i.L\_target \in LS_i$$

All the language specific characters in the language i are mapped to themselves, i.e. if $L\_source \in LS_i$ then $$\text{Language}_i.L\_target = \text{Language}_i(L\_source) = \text{Language}_i.L\_source$$

Taking any letter from a given word, for the matching language k, the word remains unchanged since the mapping applies to all the letters in the word.

For mismatch language i, if $\text{letter} \in LS_i \cup SS$, then the language dependent mapping is applied:

$$\text{Language}_i.L\_target = \text{Language}_i(\text{letter})$$

For mismatch language j, if $\text{letter} \notin LS_j \cup SS$ but ;letter $$\in \bigcup_{i=1}^{N} LS_i,$$

then the general mapping is applied $$\text{General}.L\_target = \text{General}(\text{letter})$$

After this mapping application, if $\text{General}(\text{letter}) \in LS_j \cup SS$, then a second mapping, a language dependent mapping, is carried out to map the character back to the alphabet set $LS_j$ of the $j^{th}$ language:

$$\text{Language}_j.L\_target = \text{Language}_j(\text{General}.L\_target) = \text{Language}_j[\text{General}(\text{letter})]$$

The mapping back to the alphabet set is achieved by the proper definition of the mapping $\text{Language}_i(.)$. Accordingly, by applying the mappings above, the characters of the word after the mapping belong to the language specific alphabet whether the language matches the word or not.

In an operation 26, the characters of a word are processed one character at a time. For each character, the language specific alphabet mapping table is checked. A decision is made in operation 28 if the character is in the L_source list of the language specific alphabet mapping table. If it is in the L_source list, it is kept unchanged. If the character is not in the L_source list of the language specific alphabet mapping table, the general alphabet mapping table is checked in an operation 30 and the character is converted according to the general alphabet mapping table in an operation 32.

After the application of the language specific and the general alphabet mapping tables, it is verified whether the character is included in the character set of the language in an operation 34. If the character is in the alphabet, it is kept in an operation 36. Otherwise, it is removed in an operation 38. A determination is made in operation 40 whether the current character is the last character of the word. If not, the next character is examined. If it is the last character, a pronunciation for the word is found using the TTP module.

FIG. 3 illustrates language dependent mapping tables for French, Portuguese and Spanish. The language dependent mapping tables define, how the non-standard characters outside the [a-z] range are treated for the language. The source identifies the character as is appears in a word, and the target identifies the character as it appears in the word after the application of the language specific mapping table. The language specific mapping table of English is empty, since the character set of US-English is composed of the standard character set only.

FIG. 4 illustrates a language dependent mapping table for Romanian. If a character in the standard [a-z] character set is not included in the alphabet of the language, it needs to be indicated in the language dependent mapping table. The alphabet of Romanian, for example, does not include the standard characters q, w, and y. The symbol <NULL> in the Romanian table indicates that the letters are not in the alphabet of the language, and they are removed from the words when the words are processed and passed on to TTP.

FIG. 5 illustrates a general language independent mapping table that maps all the non-standard characters outside the [a-z] range into the standard [a-z] range for the ML-ASR system supporting French, Portuguese, Spanish, and English. The table defines how the characters not included in the standard character set are mapped to the standard character set, unless they are present in the alphabet of the language.

In addition to the languages with the Latin character set, the languages with the Cyrillic character set need to be supported as well. Therefore, the Cyrillic characters are included in the language dependent character tables. In addition, due to the N-best approach, it is possible that a Latin name is identified as a Cyrillic word. Therefore, the standard set of characters needs to be mapped to the alphabet of the Cyrillic language. Due to these reasons, the language dependent character set of Ukrainian, for example, is illustrated in the table of FIG. 6. Note that in addition to the Cyrillic characters, the table provides also the mapping from the standard character set to the alphabet set of the language.

Given these mapping tables, the pronunciation of the given texts in any of the languages supported by the ML-ASR system can be found. Assume that there is a given text that needs to be converted into the language that has ID i. Then, all the letters of the text are mapped to the alphabet set of the given language according to the following exemplary logic.

```
If letter ∈ LS_i∪SS
    apply Language_i(letter) based on the mapping table
        (e.g. one of the tables in FIG. 3)
else
    apply General(letter) based on the general mapping table
        (e.g. table in FIG. 5)
    if General(letter) ∈ LS_i∪SS
        apply Language_i[General(letter)]
    endif
endif
```

The logic is applied to all the letters in the text, and the result is the text that has been converted to the alphabet set of the language i.

Figure 7:
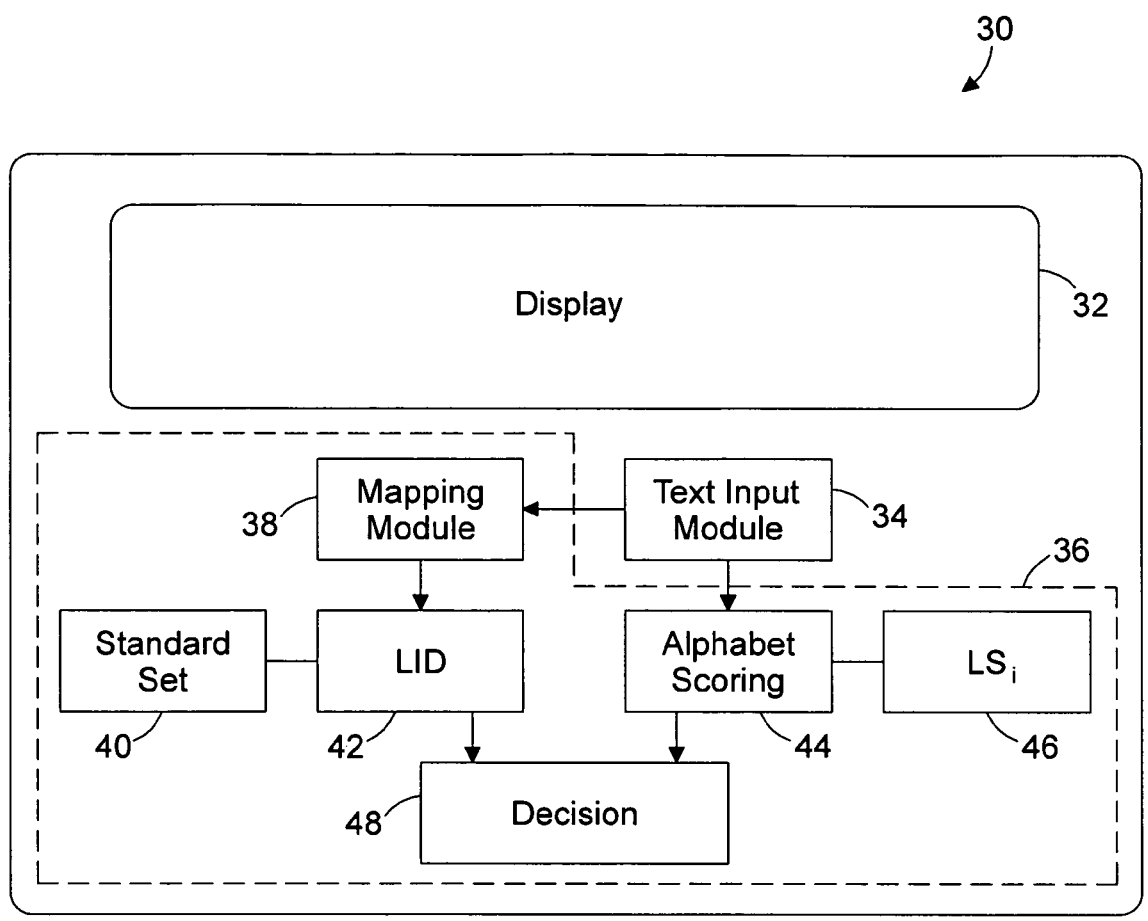
FIG. 7 is a diagram depicting a mobile station in accordance with an exemplary embodiment.

FIG. 7 illustrates a mobile station 130. The mobile station 130 can include a display 132, a text input module 134, and an LID system 136. The LID system 136 can include a mapping module 138 for mapping a word provided by the text input module 132 using the characters of the standard set 140. The LID system 136 further can include a language identifier (LID) module 142, an alphabet-scoring module 144, a plurality of language-dependent alphabet sets 146 and a decision module 148. The decision module 148 can include a processor with programmed instructions to perform the operations described above with reference to FIGS. 2-6.

While several embodiments of the invention have been described, it is to be understood that modifications and changes will occur to those skilled in the art to which the invention pertains. Accordingly, the claims appended to this specification are intended to define the invention precisely.

The invention claimed is:

1. A method of multi-lingual speech recognition, the method comprising using a device to examine characters of a word by:
   determining whether a character in the word is in a source list of a language-specific alphabet mapping table for a language,
   if the character is not in the source list:
     converting the character not in the source list according to a general alphabet mapping table and, where such conversion is performed,
     converting the converted character according to the language-specific alphabet mapping table for the language;
     verifying that the converted character in the word is in a character set of the language and keeping the character; and
     removing the character if it is not in the character set of the language;
   if the character is in the source list:
     verifying that the character in the word is in a character set of the language and keeping the character; and
     removing the character if it is not in the character set of the language;
   determining whether the character is a last character of the word,
   if the character is not the last character of the word:
     performing the examination of a next character of the word;
   if the character is the last character of the word, identifying a pronunciation of the word.

2. The method of claim 1, further comprising providing an N-best list of languages for each word in a vocabulary.

3. The method of claim 1, wherein the language-specific alphabet mapping table is constructed of a language-dependent symbol mapping.

4. The method of claim 1, wherein the general alphabet mapping table comprises characters in all language-specific alphabet sets.

5. The method of claim 4, wherein the general mapping table comprises source characters and target characters.

6. The method of claim 1, wherein the pronunciation is identified using a text-to-phoneme (TTP) module.

7. The method of claim 1, further comprising searching the general alphabet mapping table for each character in the word that is not in the source list.

8. The method of claim 1, further comprising determining whether a word is associated with a mismatched language.

9. The method of claim 8, further comprising applying the language-specific alphabet mapping table if a character in the word belongs to a union of language-specific alphabet set and a standard alphabet set.

10. The method of claim 8, further wherein the general alphabet mapping table is applied if a character in the word does not belong to a union of language-specific alphabet set and a standard alphabet set but does belong in a language-specific alphabet set for another language.

11. A device for multi-lingual speech recognition, the device effectuating examination of characters of a vocabulary entry, and comprising:
   a language identification module that assigns language identifiers to vocabulary entries;
   a text-to-phoneme module that applies language-specific models to generate a multi-lingual phoneme sequence associated with vocabulary entries identified by the language identification module;
   a multi-lingual acoustic modeling module that constructs a recognition model for each vocabulary entry according to phonetic transcription; and
   a processor that, before the application of language-specific text-to-phoneme modules, executes programmed instructions to determine whether a character in the vocabulary entry is in a source list of a language-specific alphabet mapping table for a language,
   if the character is not in the source list, the processor executes programmed instructions to:
     convert the character not in the source list according to a general alphabet mapping table;
     convert the converted character according to the language-specific alphabet mapping table; and
     remove the character if it is not in the character set of the language and keep the character if it is in the character set of the language,
   if the character is in the source list, the processor executes programmed instructions to:
     remove the character if it is not in the character set of the language and keeping the character if it is in the character set of the language, wherein
   the processor further determines whether the character is a last character of the vocabulary entry,
   if the character is not the last character of the vocabulary entry:
     the processor further executes programmed instructions to perform the examination of a next character of the vocabulary entry;
   if the character is the last character of the vocabulary entry, the processor further executes programmed instructions to identify a pronunciation of the vocabulary entry.

12. The device of claim 11, wherein the processor determines whether a vocabulary entry is associated with a mismatched language.

13. The device of claim 12, further comprising applying the language-specific alphabet mapping table if a character in the vocabulary entry associated with a mismatched language belongs to a union of language-specific alphabet set and a standard alphabet set.

14. The device of claim 12, further wherein the general alphabet mapping table is applied if a character in the vocabulary entry associated with a mismatched language does not belong to a union of language-specific alphabet set and a standard alphabet set but does belong in a language-specific alphabet set for another language.

15. The device of claim 11, wherein the device is a handheld device.

16. The device of claim 11, wherein the device is a mobile phone.

17. A computer program product embodied on a memory, comprising:

computer code that determines whether a character in a word is in a source list of a language-specific alphabet mapping table for a language by examining characters of a word;

computer code that, if the character is not in the source list:
- searches a general alphabet mapping table for the character in the word that is not in the source list;
- converts the character not in the source list according to the general alphabet mapping table;
- converts the converted character according to the language-specific alphabet mapping table; and
- removes the character if it is not in a character set of the language and keeps the character if it is in the character set of the language, computer code that, if the character is in the source list:
- removes the character if it is not in a character set of the language and keeps the character if it is in the character set of the language, computer code that performs the examination of a next character of the word if the character is not a last character of the word; and computer code that identifies a pronunciation of the word if the character is the last character of the word.

18. The computer program product of claim 17, further comprising computer code that identifies a pronunciation of the word.

19. The computer program product of claim 17, further comprising computer code that identifies words with mismatched language identified.

20. The computer program product of claim 19, further comprising applying the language-specific alphabet mapping table if a character in the word associated with the mismatched language identified belongs to a union of language-specific alphabet set and a standard alphabet set.

21. The computer program product of claim 19, wherein the general alphabet mapping table is applied if a character in the word associated with the mismatched language identified does not belong to a union of language-specific alphabet set and a standard alphabet set but does belong in a language-specific alphabet set for another language.

22. A device for multi-lingual speech recognition, the device comprising:

means for assigning language identifiers to vocabulary entries;

means for applying language-specific text-to-phoneme models to generate a multi-lingual phoneme sequence associated with vocabulary entries identified by the assigning means;

means for constructing a recognition model for each vocabulary entry according to phonetic transcription; and means for, before the application of language-specific text-to-phoneme modules, executing programmed instructions to determine whether a character in a vocabulary entry is in a source list of a language-specific alphabet mapping table for a language by examining characters of the vocabulary entry, wherein, if the character is not in the source list, the means for executing programmed instructions is configured to:
- convert the character not in the source list according to a general alphabet mapping table;
- convert the converted character according to the language-specific alphabet mapping table; and
- remove the character if it is not in the character set of the language and keep the character if it is in the character set of the language, wherein, if the character is in the source list, the means for executing programmed instructions is configured to:
- remove the character if it is not in the character set of the language and keep the character if it is in the character set of the language, wherein if the character is not a last character of the word:
- the means for executing programmed instructions is configured to perform the examination of a next character of the word;

wherein if the character is the last character of the word,
- the means for executing programmed instructions is configured to identify a pronunciation of the word.

* * * * *